June 27, 1950 W. H. STOUT ET AL 2,512,694
AUTOMATIC DRAIN VALVE
Filed Jan. 10, 1949 2 Sheets-Sheet 1
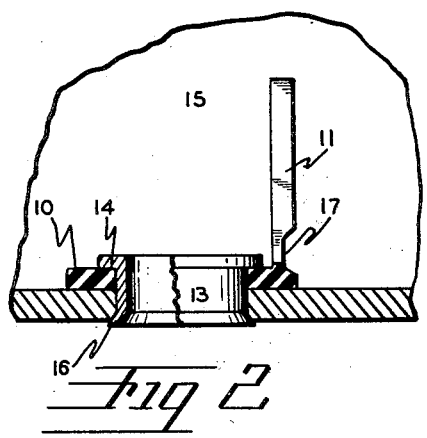
Fig 2
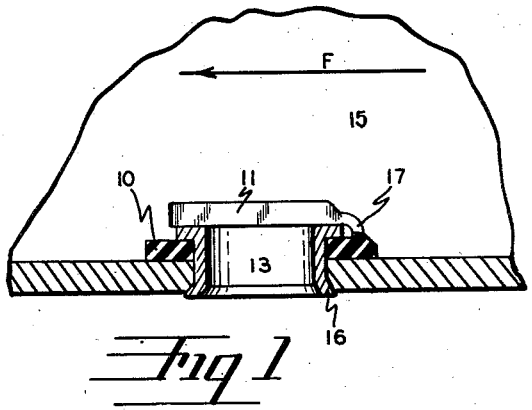
Fig 1
Fig 3
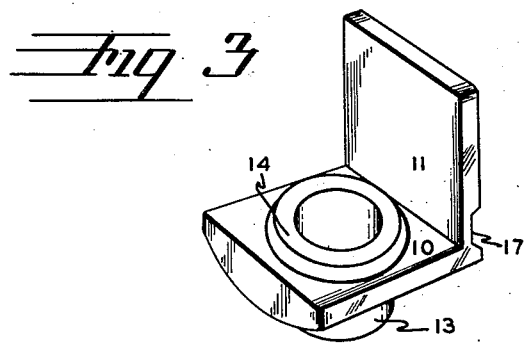
Fig 4
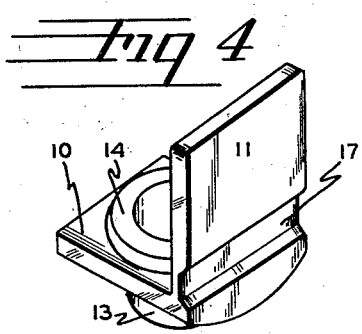
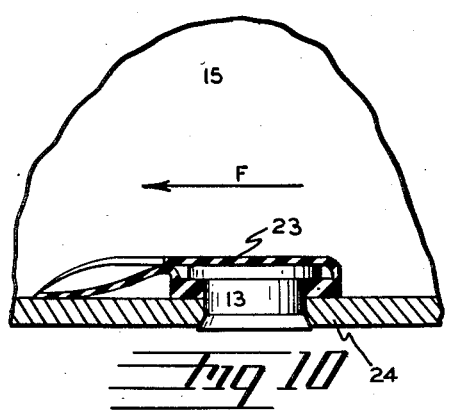
Fig 10
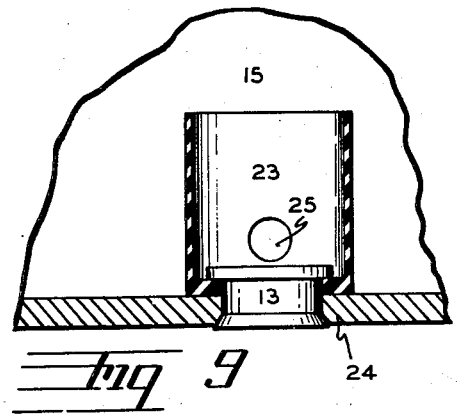
Fig 9
INVENTORS
WILLIAM H. STOUT
JOHN B. TERRILL JR.
BY
*T. R. Geisler*
ATTORNEY June 27, 1950 W. H. STOUT ET AL 2,512,694
AUTOMATIC DRAIN VALVE
Filed Jan. 10, 1949 2 Sheets-Sheet 2

INVENTORS
WILLIAM H. STOUT
JOHN B. TERRILL JR.
BY
ATTORNEY

Patented June 27, 1950

2,512,694

UNITED STATES PATENT OFFICE 2,512,694

AUTOMATIC DRAIN VALVE

William H. Stout and John B. Terrill, Jr., Portland, Oreg.; said Terrill assignor to Stout Irrigation, Inc., Portland, Oreg., a corporation of Oregon Application January 10, 1949, Serial No. 70,095

6 Claims. (Cl. 277—71)

This invention relates to drain valves for pipe lines, and, more specifically, to drain valves of the automatic type.

The invention is concerned particularly with pipe lines through which water or other liquid flows but from which the liquid remaining in the pipe line is required to be drained off when the flow through the pipe line is shut off. The invention is intended primarily for use in surface irrigation pipe lines.

Irrigation pipe lines which are laid along the surface of the ground, and to which stand pipes and sprinker heads are attached, are generally so arranged as to be movable from one location to another. Instead of entirely demounting the pipe line, and thus disconnecting all the sections to permit each pipe section to be moved separately, when the pipe line is to be used for irrigating another section of the field, it is customary, whenever possible and feasible, to drag the entire pipe line across the field, for example, by a farm tractor, since considerable time and labor can thus be saved in avoiding the moving of each pipe section separately. However, when a long pipe line is to be moved or dragged along the ground it is desirable, and generally necessary, to drain the water from the pipe line first, since the pipe line when filled with water will usually be too heavy to be moved in this manner. While surface irrigation pipe lines may be made of aluminum or other light weight material they will ordinarily be quite large in diameter with the result that they will hold a considerable volume and weight of water.

If, when a surface pipe line of this type is to be drained and moved, all the draining of the water takes place at the end of the pipe line, time must be allowed for the draining to take place. However, permitting water to drain from the end of a surface pipe line will not enable the water to be drained out from portions of the pipe line which may follow depressions in the contour of the ground. Furthermore, when the greater portion of the water in a pipe line is caused to drain from the end of the line, this flow of a comparatively large amount of water at one point may result in a hole being washed in the ground.

An object of this invention is to provide improved means for draining liquid from a pipe line, more particularly in draining water from a surface irrigating pipe line, which will enable the draining to take place quickly throughout the pipe whenever desired.

Another object of this invention is to provide an improved drain valve, especially designed for surface irrigating pipe lines, and suitable for being installed at short intervals along the pipe line, in pipe sections or preferably in coupling sections, which valve will open automatically in order to drain the water from the particular section of the line in which the valve is placed, whenever the flow of water and the water pressure in the pipe line are substantially reduced; and, which similarly will close automatically whenever the normal flow of water and resulting pressure in the pipe line is resumed.

A further object of this invention is to provide an improved automatic drain valve, operated by the flow and subsequent pressure of water or liquid in a pipe line which will be simple and inexpensive to manufacture and install.

An additional object of this invention is to provide an automatic drain valve which will not have the customary metal elements and sliding metal members and in which there will be no likelihood of any inadvertent clogging of the valve taking place.

These objects and other advantages we attain by making a drain valve preferably of flexible resilient material, mounted entirely inside the pipe line, and actuated by the flow of liquid in the pipe line, as hereinafter described with reference to the accompanying drawings.

In the drawings:

Fig. 1 is a sectional elevation of our drain valve installed in a pipe line, showing the valve in automatically closed position as the result of the normal flow and subsequent pressure of the liquid in the pipe line;

Fig. 2 is a similar section showing the valve of Fig. 1 returned to open draining position when the flow of liquid through the pipe line and the pressure producing such flow have been discontinued;

Figs. 3 and 4 are perspective views of the valve itself before being installed in a pipe line;

Fig. 9 is a sectional elevation of a further modified form in which our drain valve may be made, this figure showing the valve in open position in the pipe line; and Fig. 10 is a corresponding sectional elevation showing the valve of Fig. 9 in closed position.

Figures 5, 6:
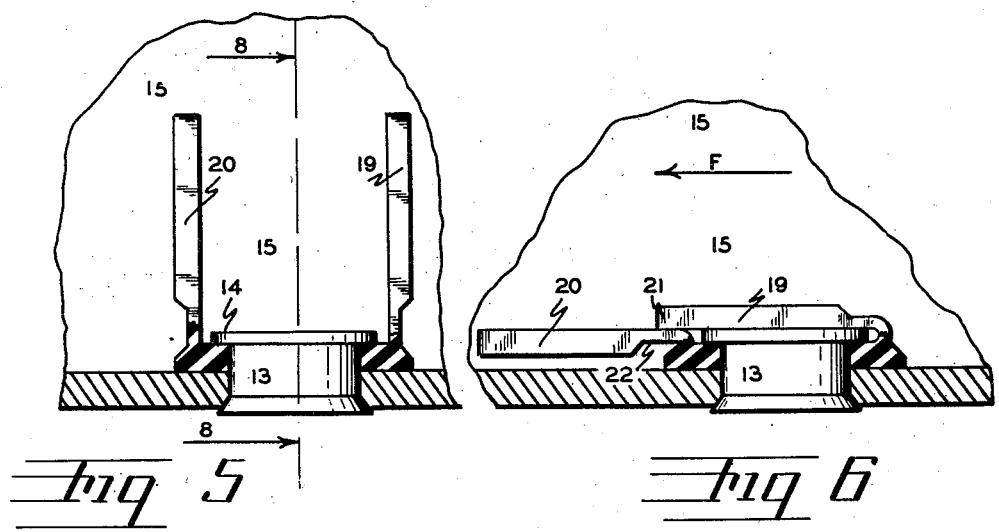
Fig. 5 is a sectional elevation of a modified form of our drain valve showing the same in normal open or draining position in the pipe line.
Fig. 6 is a corresponding sectional elevation of the same valve showing the valve in closed position in the pipe line.

The arrows F in Figs. 1, 6 and 10 indicate the direction of normal flow of liquid through the pipe line.

Referring first to Figs. 3 and 4, the valve element itself comprises a pre-formed member made of rubber or other flexible resilient material and having a base portion 10 and an upstanding movable flap 11. The base portion 10 is preferably square in shape, the top face being substantially flat, and the bottom face 12 preferably being convex transversely to correspond to the inside surface of the pipe or coupling section in which the valve is installed. The base portion 10 is formed with a central opening through which a metal drain sleeve 13 extends. The upper end of the drain sleeve is formed with a peripheral flange 14 so as to hold the valve element on the drain sleeve.

Since the entire valve element is preferably formed of flexible resilient material such as rubber, the upstanding flap 11, while normally extending upwardly substantially at right angles to the top face of the base 10, is capable of being bent down over the base, and, when so pressed down, will serve to close the top end of the sleeve 13.

Figs. 1 and 2 show our valve mounted in a pipe coupling section 15. A hole is made in the bottom of the pipe coupling and the sleeve 13 with the valve element secured thereon passes through the hole in the pipe or coupling, the bottom or outside end of the sleeve 13 then being deformed outwardly as shown at 16, so as to cause the sleeve 13 to be firmly secured in the pipe or coupling and to hold the base 10 of the valve element firmly clamped against the inside of the pipe or coupling.

Other means could of course be used for securing the sleeve as well as the valve element in place in the pipe line. For example, the sleeve could be threaded into the pipe or coupling, or clamping nuts could be used with the sleeve. However, we prefer to mount the sleeve and valve element in the manner illustrated in Figs. 1 and 2 since this is the simplest way of doing so.

As indicated in Figs. 1 and 2, the valve element is so positioned in the pipe line that the flap 11, when in the raised position shown in Fig. 2, will be approximately perpendicular to the pipe line axis. Also the valve element is so positioned with respect to the direction of flow of the liquid through the pipe line that the liquid, moving in the direction indicated by the arrow F in Fig. 1, will strike against the rear face of the flap 11 when the flap is in the raised position of Fig. 2 and thereby cause it to bend down towards the position shown in Fig. 1.

In an irrigating pipe line our valve would be installed in pipe sections or preferably in coupling sections at spaced distances along the entire pipe line. The operation of each valve, as thus far described, would then be as follows: When the water is turned on in the pipe line the flow of water through the pipe line to the sprinkler heads will strike against the normally upstanding flap 11 and cause it to bend down over the top of the sleeve 13, thus temporarily producing partial sealing of the drain outlet through the sleeve, and the subsequent pressure of the water in the pipe line as the flow of the water is made to continue will cause the water to bear down on the top of the flap with sufficient pressur to cause the flap to produce a tight seal.

However, as soon as the water is shut off in the pipe line and pressure is reduced and the flow movement of the water substantially decreases, the flap 11 will spring back to its normal upright position and thereby permit the water, which is standing in that particular section of the pipe line in which the valve is located, to drain out through the sleeve, 13, as illustrated in Fig. 2. Since our automatic valve is placed at points along the pipe line which are not too far apart, and since when the water to the pipe line is shut off, the only pressure on each drain valve will be caused by the weight of the water standing in that particular section which is served by the drain valve, the flap 11 will spring back to open or upright position almost immediately. When this occurs the water standing in such section of the pipe line served by the drain valve will quickly drain off. Thus when the drain valves are installed at reasonably short distances along the pipe line the draining of the entire pipe line will be accomplished quickly as well as automatically, and furthermore the relatively small amount of water discharged through each drain valve under such conditions will not be sufficient to wash out any substantial holes in the ground surface contiguous to the pipe line.

In making our valve element with the integral, resilient or spring-like flap 11 as illustrated, we have found it desirable to form the flap with a transversely-extending section or strip 17 at the bottom of less thickness than the remaining portion of the flap. This section 17 of reduced thickness serves as the hinge portion of the flap, as illustrated in Fig. 1. Reducing the thickness of this hinge portion has several advantages. It enables the remaining portion of the flap to be made as heavy and thick as desired, thus increasing the sturdiness and life of the flap and consequently increasing the life of the entire valve. At the same time it enables the flap to bend over easily regardless of the thickness of the upper portion of the flap, and in this way enables the flap to respond to the force of even a moderate rate of flow through the pipe line. Finally, as will be noted in Fig. 1, it permits a sharper bend to be made along the hinge portion 17 and, when this hinge portion is located close to the top of the sleeve 13, insures a satisfactory seal between the flap and the top of the sleeve along the part adjacent to the flap hinge. However, the hinge portion of the flap might be formed in various other ways, and, under some conditions, it might be desirable to make the hinge portion thicker instead of thinner.

Figure 7:
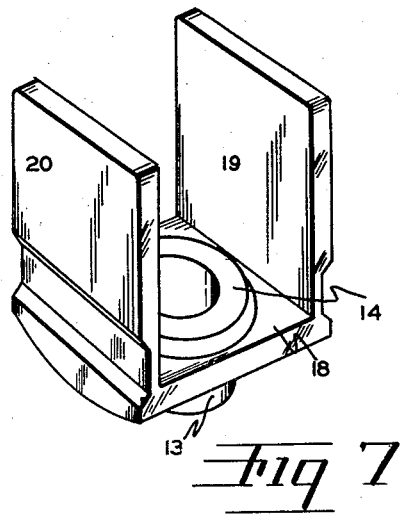
Fig. 7 is a perspective view of the valve of Figs. 5 and 6.
Figure 8:
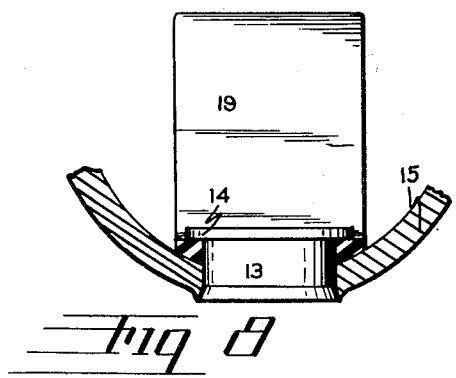
Fig. 8 is a transverse sectional elevation taken on line 8—8 of Fig. 5.

Instead of having a single upstanding flap our valve may be made with a pair of such flaps positioned opposite each other, as illustrated in Fig. 7. It will be noted that the valve illustrated in Fig. 7 has the two flaps 19 and 20 extending upwardly from opposite edges of the base portion 18 in substantially parallel planes. The two flaps 19 and 20 are identical and each flap is similar to the flap 11 of Figs. 1 and 4.

The operation of our valve when formed in this manner with a pair of flaps is similar to the operation with a single flap as previously described. Thus when the flow of the water in the pipe line occurs in the direction indicated by the arrow F in Fig. 6 the flap 19 acts in the same manner as flap 11 in Fig. 1. Under such conditions the second flap 20 will assume the related position illustrated in Fig. 6.

The making of our valve with two flaps instead of one flap, however, has two advantages. First, it enables the valve to function regardless of the direction of the flow of the water through the pipe line. Thus it will be apparent from Figs. 5 and 6 that the flap 19 will act as the sealing flap when the flow is in one direction, and similarly the other flap 20 will act as the sealing flap if the direction of the flow through the pipe line is reversed. When our two-flap valves are installed in a pipe line, either end of the pipe line accordingly may then be connected to the pump or source of water supply as most convenient, and the other end of the pipe line closed with a suitable plug.

The flaps 19 and 20 may be made slightly longer than the single flap 11. If this is done the free end of the sealing flap, of the two-flap valve, when a flap is in closed position will be caused to overlie the bottom portion of the opposite flap. Thus it will be noted in Fig. 6 that the top end portion 21 of the flap 19 overlies the bottom portion 22 of the other flap 20 when the flap 19 is in sealing position. When the water in the pipe line is shut off and the sealing flap 19 is then to return to open position, the return or the upward movement of the flap 20 to upstanding position will exert a lifting force on the end 21 of the sealing flap 19 and thus assist the flap 19 in moving out of its sealing position should it hesitate to do so. When the pipe line follows a depression in the contour of the ground the weight of the water, with the resulting suction pressure exerted on the sealing flap, might in extreme cases be sufficient to keep the flap down in sealing position for a considerable time after the flow of the water has ceased. However, when our two-flap valve is used the additional lifting force exerted by the second flap on the outer end of the sealing flap will then aid in breaking the seal at that point, and any slight break in the seal will be sufficient then to release the sealing flap and permit it to return to the full open position through the spring-like action of its own hinge section.

In Figs. 9 and 10 we show another modified form in which our automatic drain valve may be made. Instead of the hinged flap, or pair of hinged flaps, attached to the base portion, the valve in these figures is formed with a relatively thin cylindrical wall 23 extending upwardly from the perimeter of the base 24. Thus a flexible and collapsible and normally upstanding tube 23 open at the top, takes the place of the flap or pair of flaps of the previously described construction. The cylindrical or tubular wall 23 is made sufficiently thin and flexible so that flow of the water in either direction through the pipe line, for example, the flow of the water in the direction indicated by the arrow F in Fig. 10, will cause the cylindrical or tubular wall 23 temporarily to collapse in that direction, whereupon one portion of the collapsed wall, extending over the top of the sleeve 13 will act to seal the outlet through the sleeve.

When our valve is made in this modified form it is necessary to make some provision for the passage of water through the lower portion of the wall 23 when the valve is in open position. Otherwise, as apparent from Fig. 9, the water would not drain below the top of the wall 23. For this purpose we provide a pair of oppositely-positioned ports 25, one of which is shown in Fig. 9, both ports being located in the bottom of the flexible wall 23. These ports are made in substantial alignment transversely with respect to the pipe axis and thus with respect to the direction of flow of water through the pipe line, and, while these ports are large enough to permit the desired draining to take place within a moderately short time, they are not made wide enough to extend into the sealing portion of the wall when the wall is in the collapsed position, and consequently do not prevent the forming of a satisfactory seal by the wall whenever the wall is bent over by the flow of water through the pipe line.

Various minor modifications could be made in the shape and construction of the sealing flaps or the sealing wall in our automatic drain valve without departing from the principle of our invention. Also various materials could be used in making the base portion of the valve as well as the major portion of the sealing flaps, and the spring-like hinges for the flaps could also be formed in various ways. However we believe that the most satisfactory results will be obtained when the valve is made as an integral element in any of the forms we have described from rubber or other material having rubber-like resiliency and flexibility.

We claim:

1. In a pipe line adapted to have a flow of liquid therethrough, an automatic drain valve of the character described including a base portion, means for securing said base portion within the pipe line, a drain outlet extending through said base portion and through the underlying pipe line wall, a flexible resilient element attached to said base portion so arranged as to extend into said pipe line and into the path of liquid flowing through said pipe line, a portion of said element presenting a surface tending to oppose the normal flow of liquid in said pipe line over said drain outlet, the resiliency of said element being insufficient to maintain said element in opposition to said liquid flow, whereby the normal flow of liquid in said pipe line will cause said element to bend down over said drain outlet and, in cooperation with the pressure in said pipe line, temporarily seal said outlet, but the resiliency of said element being sufficient to cause said element to return to normal position, whenever the liquid flow and pressure are substantially reduced in said pipe line, and thereby reopen said drain outlet.

2. A drain valve for a pipe line of the character described, said valve including a base portion, means for securing said base portion within the pipe line, a drain outlet extending through said base portion and through the underlying pipe line wall, a flexible resilient flap integral with said base portion so arranged as to extend into said pipe line and into the path of liquid flowing through said pipe line, said flap presenting a surface tending to oppose the normal flow of liquid in said pipe line over said drain outlet, the resiliency of said flap being insufficient to maintain said flap in opposition to said liquid flow, whereby the normal flow of liquid in said pipe line will cause said flap to bend down over said drain outlet and, in cooperation with the pressure in said pipe line, temporarily seal said outlet, but the resiliency of said flap being sufficient to cause said flap to resume upward extending position whenever the liquid flow and pressure are substantially reduced in said pipe line, and thereby reopen said drain outlet.

3. In a pipe line adapted to have a flow of liquid therethrough, an automatic drain valve of the character described including a base portion, means for securing said base portion within the pipe line, a drain outlet extending through said base portion and through the underlying pipe line wall, a flap connected with said base portion by a spring-like hinge, said flap normally extending into said pipe line substantially perpendicular to the axis of said pipe line, said flap positioned ahead of said drain outlet in the normal direction of flow of said liquid, the spring-like character of said hinge being insufficient to enable said flap to oppose the normal flow of liquid in said pipe line, whereby the normal flow of liquid in said pipe line will cause said flap to bend down over said drain outlet and, in cooperation with the pressure in said pipe line, temporarily seal said outlet, but the resiliency of said hinge being sufficient to cause said flap to return to normal position whenever the liquid flow and pressure are substantially reduced in said pipe line, and thereby reopen said drain outlet.

4. An automatic drain valve for a pipe line of the character described, said valve comprising a base portion, means for securing said base portion within the pipe line, a drain outlet extending through said base portion and through the underlying pipe line wall, a pair of flexible resilient flaps attached to said base portion so arranged as to extend into said pipe line from opposite sides of said base portion and into the path of liquid flowing through said pipe line, said flaps normally extending substantially perpendicular to the axis of said pipe line, one of said flaps presenting a surface tending to oppose the normal flow of liquid in said pipe line over said drain outlet, the resiliency of said flaps being insufficient to maintain said flaps in opposition to said liquid flow, whereby the flow of liquid in either direction in said pipe line will cause one of said flaps to bend down over said drain outlet and, in cooperation with the pressure in said pipe line, temporarily seal said outlet, but the resiliency of said flaps being sufficient to cause said flaps to return to normal position whenever the liquid flow and pressure are substantially reduced in said pipe line, and thereby reopen said drain outlet.

5. The combination set forth in claim 4 distinguished in that the length of said flaps is such that when a flap is bent down by the flow of liquid in said pipe line the free end of said bent down flap will overlie the base portion of the other flap, whereby when the liquid flow and pressure are substantially reduced in said pipe line said other flap will assist said drain-outlet-sealing flap in resuming normal position.

6. In a pipe line adapted to have a flow of liquid therethrough, an automatic drain valve of the character described including a base portion, means for securing said base portion within the pipe line, a drain outlet extending through said base portion and through the underlying pipe line wall, a flexible resilient wall attached to said base portion so arranged as to extend into said pipe line from the perimeter of said base portion and into the path of liquid flowing through said pipe line, a portion of said flexible wall presenting a surface tending to oppose the normal flow of liquid in said pipe line over said drain outlet, the resiliency of said flexible wall being insufficient to maintain said flexible wall in opposition to said liquid flow, whereby the normal flow of liquid in either direction in said pipe line will cause said flexible wall to bend down over said drain outlet and, in cooperation with the pressure in said pipe line, temporarily seal said outlet, but the resiliency of said flexible wall being sufficient to cause said flexible wall to return to normal position whenever the liquid flow and pressure in said pipe line are substantially reduced.

WILLIAM H. STOUT.
JOHN B. TERRILL, JR.

REFERENCES CITED

The following references are of record in the file of this patent:

UNITED STATES PATENTS

| Number | Name | Date |
|---|---|---|
| 2,461,304 | Wilson | Feb. 8, 1949 |

FOREIGN PATENTS

| Number | Country | Date |
|---|---|---|
| 178,626 | Great Britain | Apr. 27, 1922 |